US010097071B2

(12) United States Patent
Xu et al.

(10) Patent No.: US 10,097,071 B2
(45) Date of Patent: Oct. 9, 2018

(54) VIBRATION MOTOR

(71) Applicants: Hongfu Xu, Shenzhen (CN); Zhilin Chai, Shenzhen (CN); Na Wu, Shenzhen (CN); Fanghua Ling, Shenzhen (CN)

(72) Inventors: Hongfu Xu, Shenzhen (CN); Zhilin Chai, Shenzhen (CN); Na Wu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 268 days.

(21) Appl. No.: 15/256,898

(22) Filed: Sep. 6, 2016

(65) Prior Publication Data

US 2017/0179804 A1 Jun. 22, 2017

(30) Foreign Application Priority Data

Dec. 22, 2015 (CN) .................... 2015 2 1075582 U

(51) Int. Cl.
*H02K 33/00* (2006.01)
*H02K 33/16* (2006.01)

(52) U.S. Cl.
CPC ............. *H02K 33/00* (2013.01); *H02K 33/16* (2013.01)

(58) Field of Classification Search
CPC ............................... H02K 35/02; H02K 33/00
USPC ............................................................ 310/15
See application file for complete search history.

(56) References Cited

U.S. PATENT DOCUMENTS 8,242,642 B2 * 8/2012 Odajima ................ H02K 33/16 310/15
8,334,624 B2 * 12/2012 Dong ..................... H02K 33/16 310/13
8,456,042 B2 * 6/2013 Dong ..................... H02K 33/16 310/15
8,624,450 B2 * 1/2014 Dong ..................... H02K 33/16 310/15
8,648,502 B2 * 2/2014 Park ....................... H02K 33/16 310/15
8,878,401 B2 * 11/2014 Lee ........................ H02K 33/16 310/15
9,024,489 B2 * 5/2015 Akanuma ............. H02K 33/16 310/15
9,306,429 B2 * 4/2016 Akanuma ................ H02K 5/24
2009/0267423 A1 * 10/2009 Kajiwara .............. H02K 33/02 310/36
2011/0266892 A1 * 11/2011 Wauke .................... B06B 1/045 310/25

(Continued)

*Primary Examiner* — Alexander Talpalatski
(74) *Attorney, Agent, or Firm* — Na Xu; IPro, PLLC

(57) ABSTRACT

The present disclosure is related to a vibration motor. The vibration motor includes a housing, a vibrator, a stator and an elastic part. One of the vibrator and the stator includes a coil, and the other includes a magnet opposite to the coil. The elastic part includes a first fixation part, a second fixation part and a connecting part. A weight includes a first side and a second side and a gap part formed by denting towards the direction far from a first side wall from the first side. The weight further includes a welding part protruding from the center of the gap part and extends to the edge of the gap part. The durability of the elastic part is accordingly increased, and the reliability of the product is thus improved.

10 Claims, 3 Drawing Sheets

(56) References Cited

U.S. PATENT DOCUMENTS

| | | | | |
|---|---|---|---|---|
| 2012/0049660 | A1* | 3/2012 | Park | B06B 1/045 310/25 |
| 2013/0169072 | A1* | 7/2013 | Oh | B06B 1/045 310/36 |
| 2013/0221767 | A1* | 8/2013 | Akanuma | H02K 33/02 310/15 |

* cited by examiner

VIBRATION MOTOR

FIELD OF THE INVENTION

The present invention relates to a vibration motor.

DESCRIPTION OF RELATED ART

A vibration motor is a kind of component which converts the electric energy into the mechanical energy by using the electromagnetic force. The vibration motor is usually installed inside a portable mobile device to produce vibration feedback, for example, the vibration of mobile phone or the vibration feedback of game player.

A related vibration motor generally comprises a fixation part and a vibration part. The fixation part comprises a housing having an accommodation space and coils arranged in the housing. The vibration part is set in the accommodation space by elastic parts, and comprises a magnet and a weight for receiving the magnet. After electrified with alternating current, the coil will interact with the magnet, producing magnetic field force. Because the coil doesn't move, the whole vibration part will be affected by the magnetic force and do the reciprocating vibration supported by the elastic element. The weights of the magnet and the weight are required to add in the vibration motor of relevant technology in order to acquire the stronger vibration feedback effect; therefore, the vibration motor will have low reliability as a result of increasing vibratory load of the vibrator and reducing durability of the elastic part.

Therefore, it is necessary to provide a kind of new technology solution to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
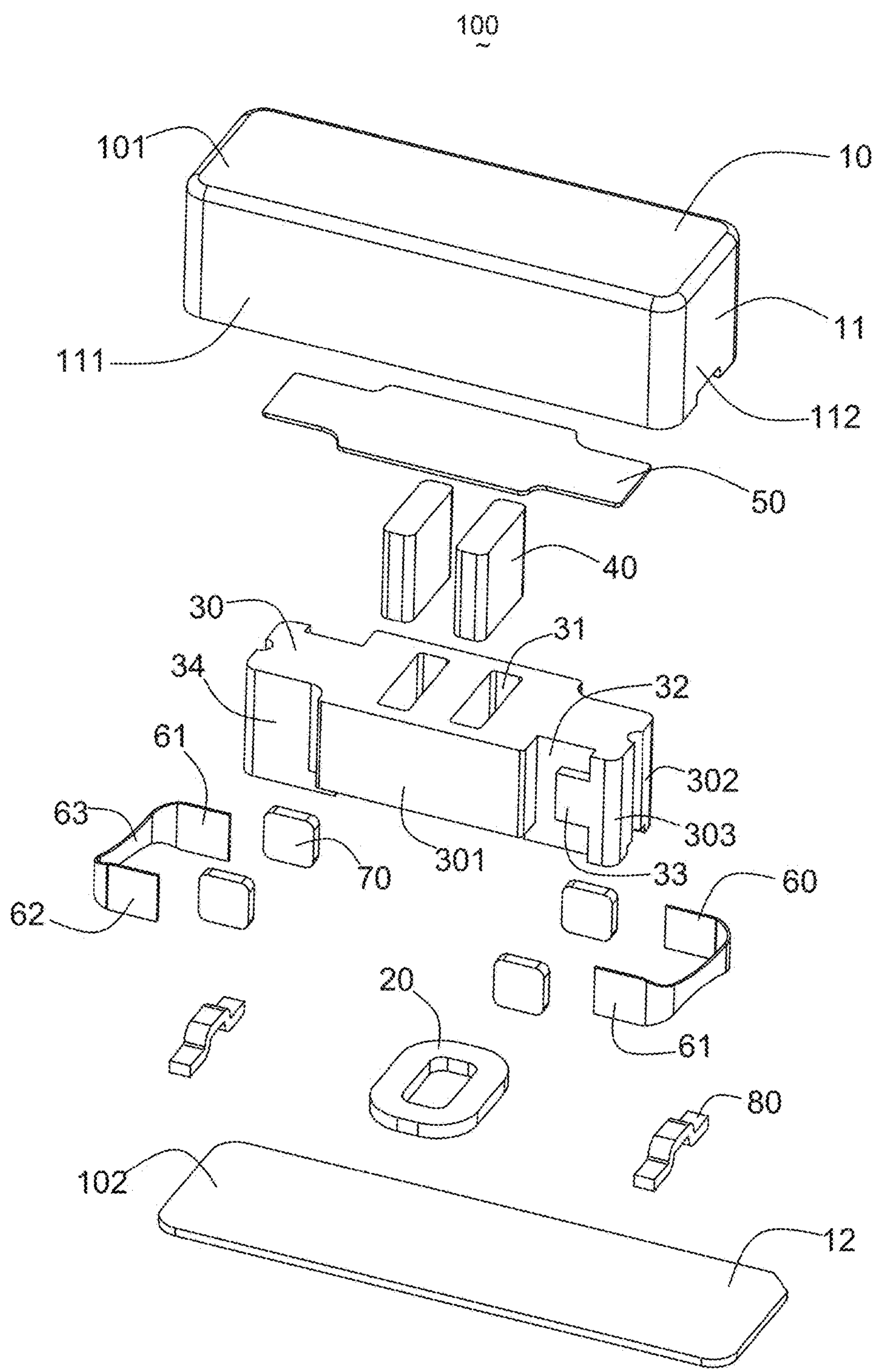
FIG. 1 is an isometric view of a vibration motor in accordance with an exemplary embodiment of the present disclosure.
Figure 2:
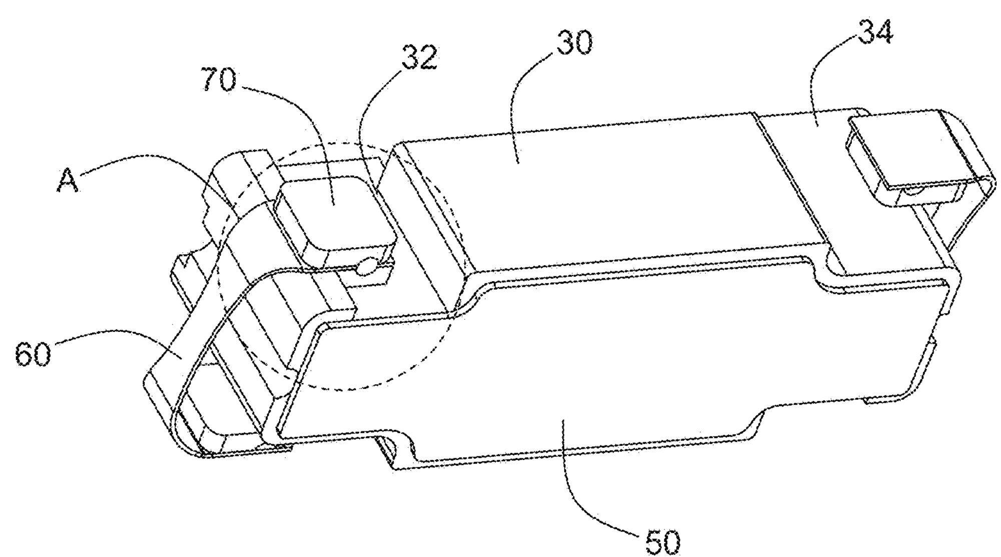
FIG. 2 is an illustration of a vibrator of the vibration motor in FIG. 1.

As shown in FIGS. 1-2, the present disclosure provides a vibration motor 100 comprising a housing 10, a vibrator accommodated in the housing 10, a stator and an elastic part 60. The housing 10 is provided with a bottom wall 12 for fixing the stator and a side wall 11 which is vertical to the bottom wall, wherein the bottom wall 12 is presented as a long strip. The vibrator is suspended in the housing 10 by using the elastic part 60 and vibrates along with the direction of long axis which is parallel to the bottom wall 12; one of the vibrator and the stator comprises coils 20, and the other comprises a magnet 40; the coils and the magnet 40 are arranged oppositely with interval. In the embodiment, the coils 20 are taken as the stator and fixed on the bottom wall 12 of the housing 10.

The vibrator comprises at least one weight having an accommodation hole 31, a magnet 40 arranged in the accommodation hole 31 of the weight 30 and a pole plate 50 which covers one side of the accommodation hole 31. The accommodation hole 31 passes through the weight 30 along with the direction vertical to the direction of vibration of the vibrator and is positioned at the center of the weight 30. In the embodiment, the numbers of the accommodation holes 31 and the magnetics 40 are 2 respectively; one or multiple accommodation holes 31 and the magnetics 40 can be arranged in the other selectable modes of execution; and the shapes of the accommodation holes 31 and the magnetics 40 are not limited to this. The coils 20 and the pole plate 50 are arranged on the upper side and the lower side of the magnet 40. The magnet 40 opposite to the coils 20 is exposed out from the accommodation hole 31, wherein the pole plate 50 plays a role of magnetic conduction and is prepared from the magnetic conductor in the embodiment.

Of course, the pole plate 50 can be prepared from the material which is identical with that of the weight 30; and the pole plate 50 covers one side of the accommodation hole 31, therefore the magnet 40 is prevented from magnetic leakage, the missing magnetic flux is hindered, and the magnetic inductivity is improved.

Alternatively, the positions of the coils 20 and the magnet 40 can be exchanged; the coils 20 are arranged on the vibrator, and the weight 30 should be taken to fix the coils 20 by means of groove, etc. rather than arranged in the accommodation hole; while it shall be feasible as well if the magnet 40, as the stator, is fixed on the bottom wall 12 of the housing 10.

The integrated structure or the split structure can be applied to the housing. The housing 10 takes the split structure and specifically comprises an outer housing 101 and a cover plate 102 jointing with the outer housing 101. The bottom wall 12 is arranged on the cover plate 102, and the side wall 11 is arranged on the outer housing 101. The side wall 11 comprises a first side wall 111 which is parallel with the direction of vibration of the vibrator and a second side wall 112 which is vertical to the direction of vibration of the vibrator. The weight 30 is presented integrally as a long strip matching with the housing 10 and comprises a first side 301 which is opposite to the first side wall 111 and a second side 302 which is opposite to the second side wall 112.

Figure 3:
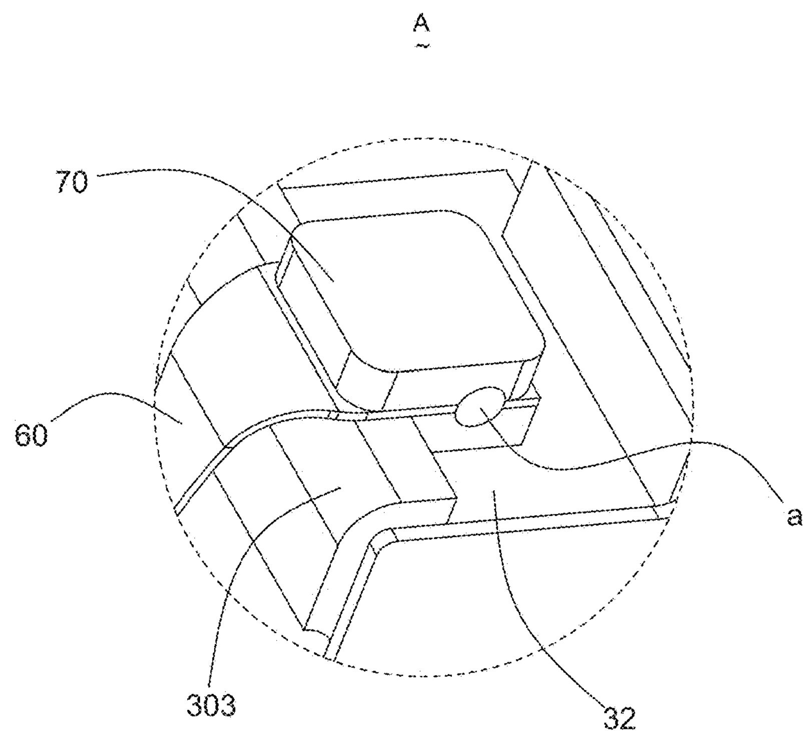
FIG. 3 is an enlarged view of Part A in FIG. 2.
Figure 4:
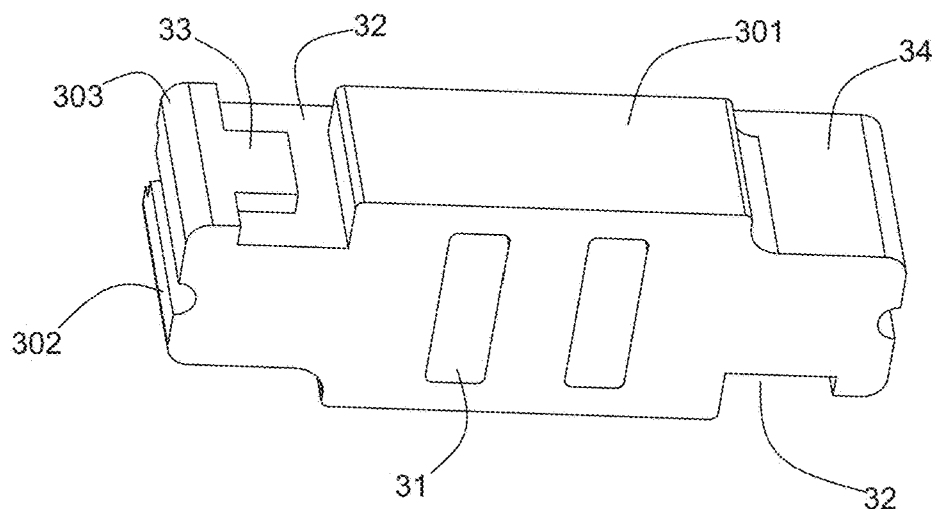
FIG. 4 is an illustration of a weight of the vibration motor in FIG. 1.

As shown in FIGS. 2-4, the weight 30 is further provided with a gap part 32 formed by denting towards the direction far from the first side wall 111 from the first side 301. In this embodiment, totally two gap parts 32 are available and are positioned in the direction of long axis close to the weight 30 respectively. Further, the projections of two gap parts on the first side 301 are located on two sides of the accommodation hole 31 respectively, that is, the two gap parts 32 are positioned on two diagonal directions of the weight 30. The weight 30 further comprises a welding part 33 which protrudes from the center of the gap part 32 and extends to the edge of the gap part 32 close to one side of the second side, wherein the welding part 33 is presented as a bulge which protrudes in the gap part 32 and connects with a first surface. The welding part 33 and the gap part 32 are arranged as a complete set, wherein there are two welding parts 33 which are positioned on two first sides 301 respectively. The projections of two welding parts on the first side are located on two sides of the accommodation hole 31 respectively The elastic part 60 comprises a first fixation 61 which connects with the vibrator, a second fixation part 62 which connects with the housing 10 and a connecting part 63 which connects the first fixation part 61 and the second fixation part 62. In this embodiment, there are two elastic parts 60 which are presented as U-shaped springs; the opening directions of the two U-shaped springs, that is, the bending direction of the connecting part 63, are opposite to each other. The first fixation part 61 of each elastic part 60 is fixed on the welding part 33; the second fixation part 62 is fixed on the first side wall 111 which is far from one side of the welding part 33; and the connecting part 63 surrounds the second sides 302 of the weight 30 and is arranged with the second side 302 with interval. The arc transition is taken between the first side 301 and the second side 302, and one round angle part 303 which connects the first side 301 with the second side 302 is available. Correspondingly, the arc transition is also applied to the connecting part 63. Moreover, the collision generated at the connecting place of the elastic part 60 and the weight can be prevented, and the reliability of the product can be improved due to arrangement of the round angle part 303.

The shape of the first fixation part 61 is identical with that of the welding part 33. As shown in FIGS. 2-3, the first fixation part 61 is adhered to the welding part 33 closely and is aligned to the edge of the welding part 33, that is, the upper end and the lower end of the first fixation part 61 parallel with the bottom wall 12 are aligned to the upper plane surface and the lower plane surface of the welding part 33 parallel with the bottom wall. The first fixation part 61 is fixed with the welding part 33 in the way of welding, and the welding spot is located at the adhesion gap of the welding part 33 and the edge of the first fixation part 61. The Point a in the figure is the location diagram of the welding spot of the first fixation part and the welding part. Due to this structure, the welding strength can be improved, the reliability of the product can be improved, and the circumstance that the reliability is affected due to dropping of the traditional elastic part can be prevented.

In this embodiment, one side of the weight 30 far from the gap part is also provided with an avoiding 34 which dents towards the direction far from the first side wall 111; the avoiding part 34 is used for avoiding the second fixation part 62 of the elastic part and preventing the product from influence of reliability as a result of collision of the second fixation part 62 and the weight 30 when the vibrator vibrates. Buffer plates 70 are also arranged between the first fixation part 61 and the first side wall 111 of the housing and between the second fixation part 62 and the weight 30. The foam can be taken as the buffer plate for preventing collision and improving the reliability of the product. Moreover, the vibrator motor 100 further comprises a stopper 80 which is arranged on the bottom wall 12 and used for preventing the vibrator from vibration exceeding the amplitude specified of the vibrator.

The weight of the vibration motor in the present disclosure is provided with the gap part and the welding part which is located at the gap part; and the vibrator and the elastic part are fixedly more firmly, the durability of the elastic part is increased, and the reliability of the product is improved due to the welding part and the welding part matching with the first fixation part of the elastic part.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:

a housing having an accommodation space and a bottom wall;

a vibrator accommodated in the accommodation space and including a weight, the vibrator capable of vibrating along a vibration direction parallel to the bottom wall;

a stator fixed on the bottom wall;

an elastic part suspending the vibrator, the elastic part including a first fixation part connecting with the weight, a second fixation part connecting with the housing and a connecting part connecting the first fixation part to the second fixation part;

one of the vibrator and the stator comprising a coil, and the other comprising a magnet opposed to the magnet; wherein the weight comprises a first side parallel with the vibration direction, a second side vertical to the vibration direction, and a gap part by denting towards the direction far from a first side wall of the first side; the weight further comprises a welding part protruding from a center of the gap part and extending to an edge of the gap part for adhering the first fixation part.

2. The vibration motor as described in claim 1, wherein the first fixation part has a shape same to the welding part.

3. The vibration motor as described in claim 2, wherein the first fixation part is aligned to the edge of the welding part.

4. The vibration motor as described in claim 1, wherein the weight comprises at least one accommodation hole running through along with the direction vertical to the vibration direction; and the magnet is accommodated in the accommodation hole.

5. The vibration motor as described in claim 4, wherein two gap parts are arranged respectively on two first sides, and the projections of the two gap parts on the first side are located on two sides of the accommodation hole.

6. The vibration motor as described in claim 5, wherein the first fixation part of the elastic part is fixed on the welding part; the second fixation part is fixed on the housing which is far from one side of the welding part; and the connecting part surrounds the second side of the weight.

7. The vibration motor as described in claim 6, wherein an arc transition is disposed between the first side and the second side.

8. The vibration motor as described in claim 6, wherein one side of weight far from the gap part is also provided with an avoiding part which dents toward the direction far from the first side wall and is used for avoiding the second fixation part of the elastic part.

9. The vibration motor as described in claim 8, wherein a plurality of buffer plates is arranged between the first fixation part and the housing, and between the second fixation part and the weight respectively.

10. The vibration motor as described in claim 9, wherein the elastic parts are U-shaped springs; and two openings of the elastic parts are opposed to each other.

* * * * *